United States Patent [19]

Godfrey

[11] 4,115,915

[45] Sep. 26, 1978

[54] PROCESS FOR MANUFACTURING MOTOR HAVING WINDINGS CONSTRUCTED FOR AUTOMATED ASSEMBLY

[75] Inventor: David E. Godfrey, Burnt Hills, N.Y.

[73] Assignee: General Electric Company, Schenectady, N.Y.

[21] Appl. No.: 795,737

[22] Filed: May 11, 1977

Related U.S. Application Data

[62] Division of Ser. No. 600,875, Jul. 31, 1975, abandoned.

[51] Int. Cl.² .............................................. H02K 15/06
[52] U.S. Cl. ...................................... 29/596; 29/625; 310/42;180;DIG. 6
[58] Field of Search ......................... 29/596, 598, 625; 310/DIG. 6, 179, 258–260, 42, 180

[56] References Cited

U.S. PATENT DOCUMENTS

3,781,980   1/1974   Possis ...................................... 29/596

Primary Examiner—Carl E. Hall
Attorney, Agent, or Firm—Donald R. Campbell; Joseph T. Cohen; Marvin Snyder

[57] ABSTRACT

A method for fabricating an electric machine stator core and winding assembly characterized by insulated sectionalized coils suitable for automatic fabrication and assembly. Bundles of straight coil side wires are externally insulated and inserted longitudinally into the stator slots, and the coil end turns are manufactured separately as planar arrays of printed circuit conductors or discrete wires adhered to end cap insulating boards. Upon stacking the boards against each stator core end face, the aligned coil end turns and sides are selectively joined to form a continuous winding. The objective is lower cost wound stators for small and medium ac and dc motors.

4 Claims, 17 Drawing Figures

PROCESS FOR MANUFACTURING MOTOR HAVING WINDINGS CONSTRUCTED FOR AUTOMATED ASSEMBLY

This is a division of application Ser. No. 600,875, filed July 31, 1975, now abandoned.

BACKGROUND OF THE INVENTION

This invention relates to electric motors and similar electric machines, and more particularly to a stator with winding coils suitable for automatic fabrication and insertion and to a method of manufacturing such a stator core and winding assembly.

Stator wound motors including the widely used ac induction motor with a squirrel cage rotor at present are constructed with pre-formed and insulated closed loop stator coils that are inserted manually into the stator slots and connected together to form the winding. The common insulation-wrapped stator coils require semi-manual and manual operations for their fabrication, especially as to forming the wound coils to shape, wrapping or taping with insulation, and insertion. Since the coil is wound in a closed loop, automatic mechanisms to wrap the wires with insulation are extremely complex and not always economical or technically practical. Insulation prior to forming the coils is already provided on the individual wires but insulation around the group of wires that form the coil is also necessary. This latter insulation operation is not possible before coil forming because it would require increased flexibility to the point where forming would not be possible without marring the insulation. Hence, manufacturers are forced to their present process technique. Further, the slot gaps in the stator core through which the wrapped coil sides are forced during assembly to the stator core are desirably small for improved electrical performance making it difficult to insert the coils. Automation of the insertion process is possible for some small motors but even then many hand operations are still required to tie end turns, adjust the shape, insulate and join consecutive coils. What little automation is done is achieved through specialized machines with tooling unique to the motor size. The forming and insulation of stator coils and insertion into stator slots accordingly is the most labor intensive area in the manufacture of electric motors.

SUMMARY OF THE INVENTION

A stator core and winding assembly for ac and dc motors and similar electric machines is constructed with insulated sectionalized coils so as to be suitable for automatic fabrication and insertion, and interconnection to form a continuous winding. In essence, the straight coil sides and connecting end turns of the coils are batch processed separately and insulated, and then the four sections of each coil are joined as by fusion joints or soldering after assembly to the stator core. In the practice of the invention, the magnetic stator core can be a conventional type core. A plurality of insulated bundles of straight coil side wires are each inserted in the stator slots with exposed end portions extending beyond the stator core end faces. A pair of annular end caps are respectively mounted on the stator core end faces, each end cap including at least one and usually a plurality of superimposed rigid insulating boards each with an adhered planar array of coil end turn conductors that respectively have joint connections with preselected coil side wires to form a continuous winding. In one embodiment, the end cap boards are printed circuit boards which can be provided with a pattern of holes through which the coil side wires extend. In another embodiment for larger motor sizes, the planar array of coil end turn conductors are formed of discrete pre-shaped wires in a nested arrangement suitable to be adhered to a rigid insulating board. Preferably the coil side and end turn wires have a rectangular (square) cross section to facilitate alignment in the stator slot and alignment to make fusion joints between coil section.

The insulated bundles of coil side wires are inserted longitudinally into the stator slots, and most commonly an end cap board is assembled and the joints made, another layer is assembled and joined, and so on. Automatic insulation of the winding can be completed by spray insulating the joints for each board or by potting with insulation after assembly and joining of all the boards. A three phase, medium ac induction motor with a squirrel cage rotor is described and has similar or improved electrical performance as compared to conventional prior art motors.

DESCRIPTION OF THE PREFERRED EMBODIMENTS

Figure 1A:
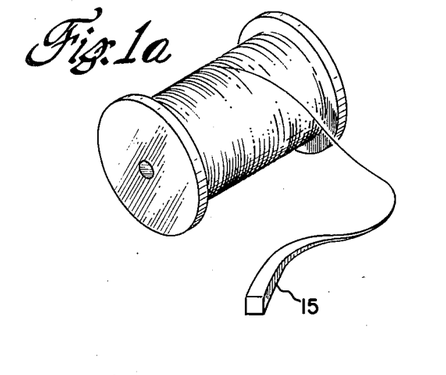
FIGS. 1a–1e illustrate diagrammatically the major steps of the motor coil manufacturing and insertion process according to the teaching of the invention.
Figure 1B:
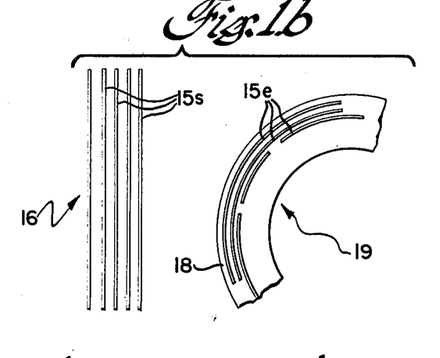
Figure 1C:
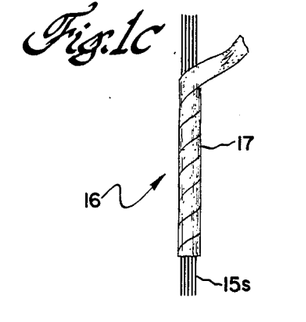

In order to facilitate understanding of the automated motor coil manufacturing and insertion process herein described and stator coil winding assembly with sectionalized coils that is produced, the major steps in the manufacturing process are illustrated in diagrammatic form in FIGS. 1a–1e. Although suitable for other rotating electric machines such as generators, the process is especially suitable for the automatic winding, insertion, insulation, and interconnection of motor coils for field and stator windings of small and medium dc and ac electric motors up to about 1000 hp. Referring to FIGS. 1a–1c, copper or aluminum wire 15 from a commercially available large spool of electrical wire is automatically cut to length to provide a plurality of straight coil side wires 15s which are stacked in a predetermined pattern to provide bundles 16 of straight coil side wires. Preferably, the wire has a rectangular or square cross section to increase the packing density and to facilitate location of each wire 15s at a predetermined position within each bundle. An external insulating layer 17 is applied to each bundle while leaving the end portions of the coil side wires exposed, and typically is automatically wrapped with insulating tape although spraying or dipping the external insulation may be suitable for some coils. Within each insulated bundle 16, the individual wires 15s are insulated and may have the same or graduated lengths.

Figure 1D:
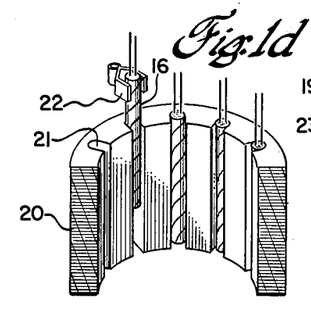
Figure 1E:
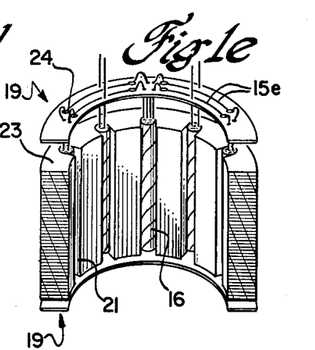

The insulated coil end turn sections are batch processed separately, preferably cutting and curving the wire 15 to form a planar array of coil end turn conductors 15e which are insulated and given structural integrity by adhering the array to a thin ring-shaped, rigid insulating substrate 18. In veiw of the similarity to a printed circuit board, this assembly is hereafter referred to as an end cap board 19. For motors with lower current carrying capacity, as will be further explained, the end cap boards 19 can in fact be printed circuit boards with printed circuit coil end turn conductors. In accordance with the invention, the straight coil side wires 15s and coil end turn conductors 15e are not joined together to form complete coils until after insertion of insulated bundles 16 in the stator slots and assembly of end cap boards 19 parallel to either end face of the stator core. As shown in FIG. 1d, stator core 20 has a conventional configuration and is typically comprised of stacked punchings or laminations made of steel or other magnetic material, with a plurality of peripherally spaced, axially extending and inwardly opening stator slots 21.

Figures 2, 3:
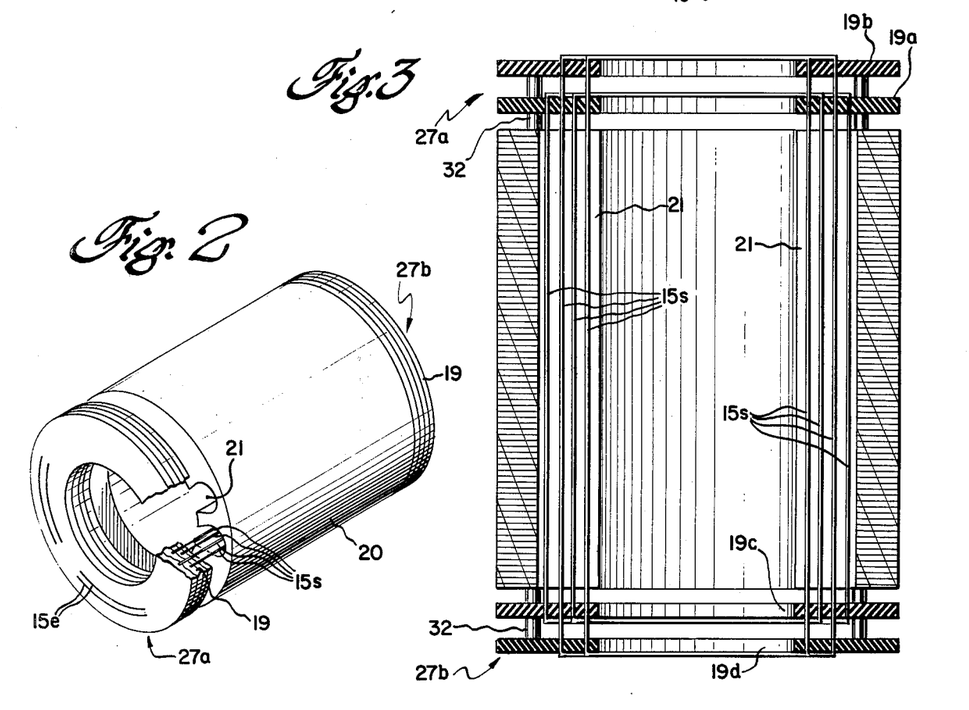
FIG. 2 is a schematic perspective view of the stator core and winding assembly fabricated by means of the process in FIGS. 1a–1e.
FIG. 3 is an exploded view in cross section of one embodiment of the invention using printed circuit coil end turns and showing by way of example end caps each comprising two printed circuit boards.

Automatic insertion of coil side wire bundles 16 into stator slots 21 is achieved by longitudinally inserting each bundle into a predetermined stator slot such that the exposed end portions extend beyond the stator core end faces. The numerically controlled mechanism 22 with retractable fingers shown diagrammatically in FIG. 1d can be used for this operation. The end cap boards 19 are now assembled against either stator core end face 23 (FIG. 1e), properly aligned so that the preselected coil end turn conductors and coil side wires to be joined together are in alignment. Joint connections 24 connecting the individually fabricated and assembled coil sections suitably are fusion or solder joints capable of automated processing. The completed stator core and winding assembly with sectionalized coils is shown in FIG. 2. In order to provide a sufficient number of coil end turn conductors with adequate cross-over capability, all at low manufacturing cost, a plurality of end cap boards 19 are ordinarily required at each end of stator core 20. The pair of stacked or superimposed groups of end cap boards 19 are hereafter referred to as the annular end caps 27a and 27b. In one method of assembly of each annular end cap, an end cap board 19 is assembled parallel to the respective stator core end face and the joints are fabricated and spray insulation is applied, another end cap board 19 is assembled in superimposed relationship and the joints fabricated and spray insulation applied, and so on. Another method of assembly is to proceed as before without spray insulating between boards, and then pot with insulating material as a single operation at the end. Advantageously, the inner and outer diametric dimensions of each annular end cap correspond approximately to the inner and outer dimensions of stator core 20.

Figure 4A:
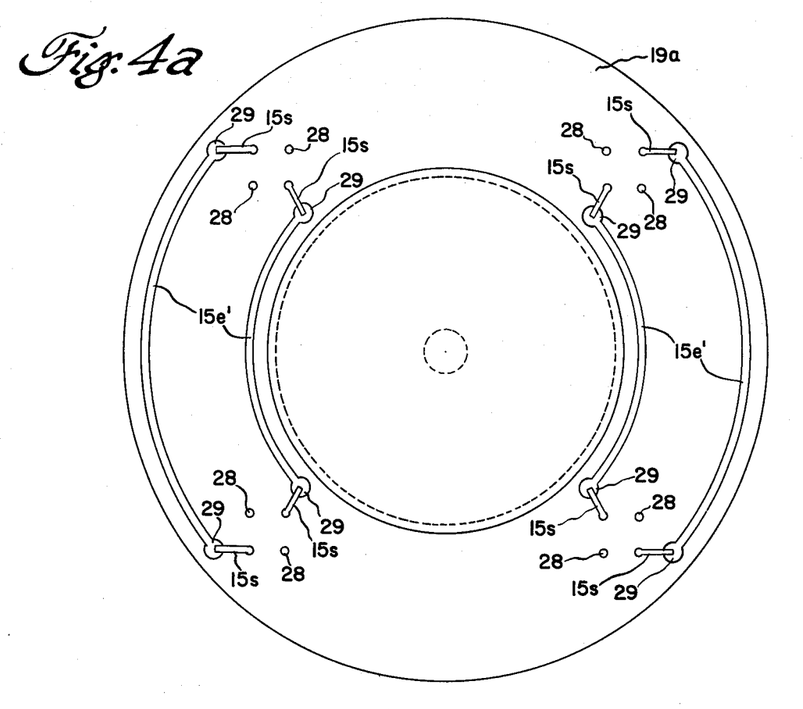
FIGS. 4a and 4b are plan views of the printed circuit boards making up an end cap in FIG. 3, with the rotor and shaft indicated in dashed lines.
Figure 4B:
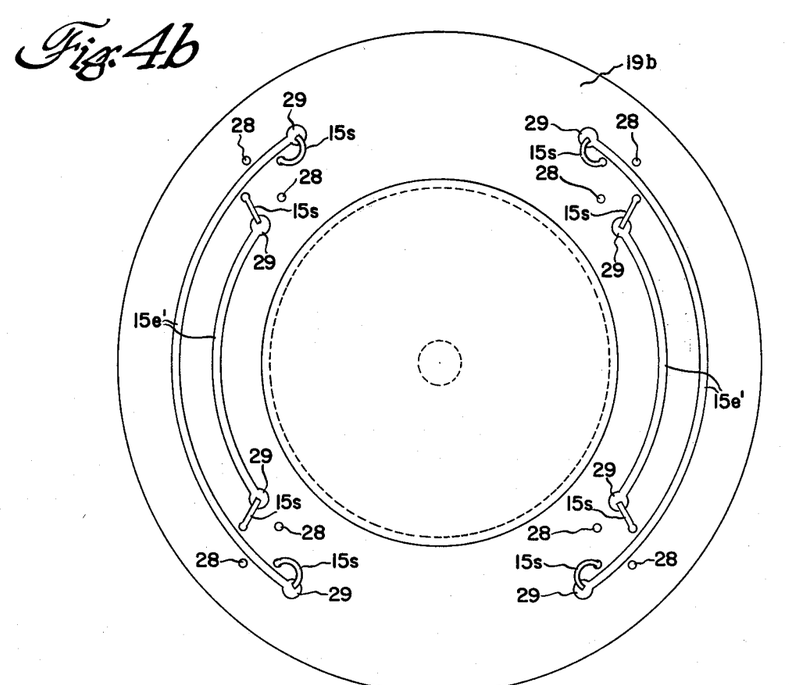

FIGS. 3 4a, and 4b show one embodiment of the invention wherein the end cap boards in each annular end cap are printed circuit boards with printed circuit coil end turn conductors. The simple stator core and winding assembly with four stator slots here illustrated in simplified form is suitable, when additional coils are provided, for a small two-pole, shunt wound dc motor, the remainder of the motor being conventional. FIG. 3 is a partially exploded view in cross section showing a pair of opposing stator slots 21 in each of which is inserted by way of illustration only four coil side wires 15s, the external insulation having been omitted. For simplicity, end cap 27a is shown as comprised by only two printed circuit boards 19a and 19b and likewise the other end cap 27b has two boards 19c and 19d. Alignment between each coil side wire bundle and the end cap boards, so that a preselected coil side wire is joined to a preselected coil end turn conductor to form a coil, is achieved by inserting the end portions of the coil side wires through patterned holes in the boards. Referring to the plan views of the boards 19a and 19b, FIGS. 4a and 4b, each board has four repeated patterns of holes, each with four holes 28, and further has a plurality of curved printed circuit coil end turn conductors 15e', each terminated at both ends by an enlarged contact area 29. For each bundle of four coil side wires 15s, two are bent over against the outer surface of inner board 19a and soldered or otherwise joined to the adjacent contact areas 29, while the other two wires pass through to the outer board 19b and are bent over and soldered to the contact areas 29 thereon. Thus, when the coil sections are properly aligned and joined, a continuous coil and winding are produced. This is clarified in the diagrammatic developed view in FIG. 5.

Figure 5:
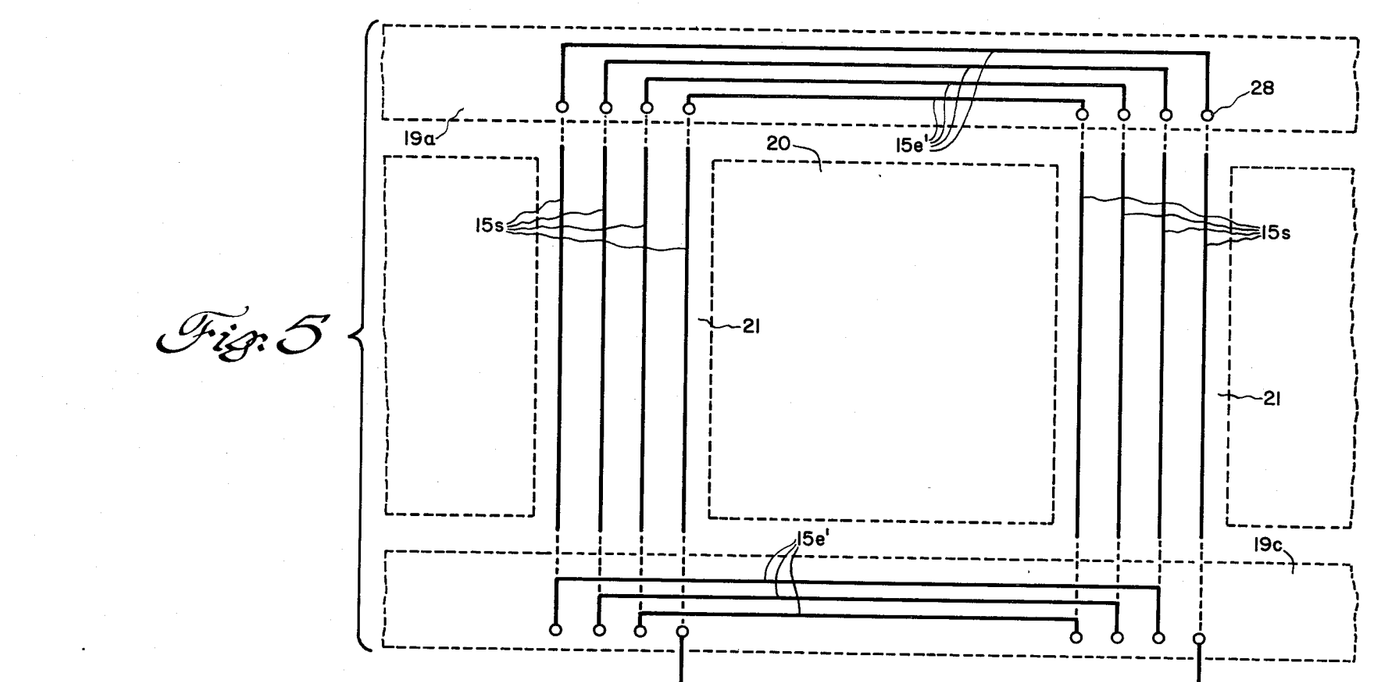
FIG. 5 is a diagrammatic developed view of a pair of stator slots and a number of coil sections including coil side wires and printed circuit coil end turns on a single board at each end of the stator core.
Figure 6:
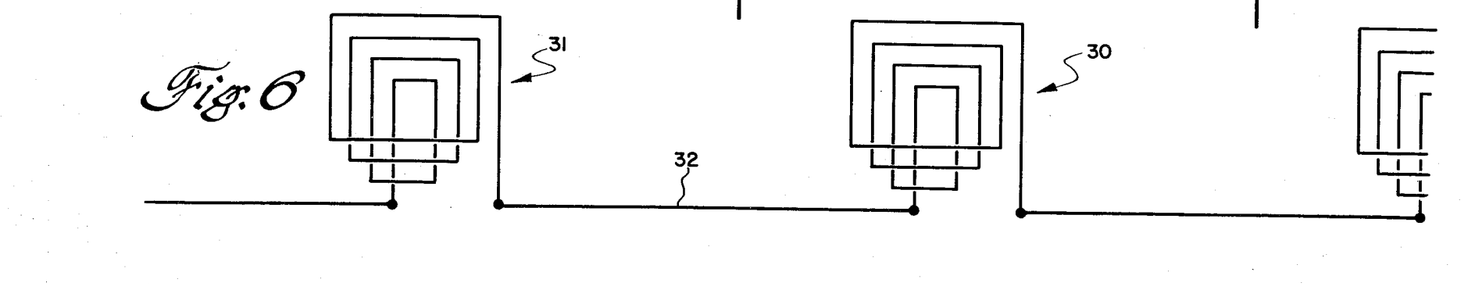
FIG. 6 shows the continuous coil pattern produced when the coil sections in FIG. 5 are interconnected, and also the interconnection to another such coil group to form a winding section.

In FIG. 5, only two stator slots 21 and two end cap boards 19a and 19c are illustrated inasmuch as the simple coil pattern shown requires no crossovers. Assuming that the end portions of coil side wires 15s are inserted into the vertically adjacent holes 28 in boards 19a and 19c and the soldered joint connections made, the coil pattern 30 shown at the side in FIG. 6 can be traced out. With this sectionalized coil, automated assembly approach to motor coil manufacturing and insertion, the end cap board conductor patterns can also provide for the automated interconnection of two such coils 30 and 31 to form a continuous motor winding. The conductor patterns can include a special interconnection conductor 32, or alternatively the end of one coil can be connected directly to the beginning of the adjacent coil. The motor windings themselves can be identical to prior art motor windings, the many variations for different types of dc and ac motors being too numerous to mention specifically. By using a greater or smaller number of end cap boards and by providing crossovers from one board to the next, many motor winding configurations can be constructed.

Printed circuit boards 19a–19d (FIG. 3) typically are conventional reinforced epoxy boards such as glass epoxy panels. The printed circuit patterns on one face of each board are fabricated using either additive or subtractive processes as are known in the art. After assembly to the stator end face and forming the joint connections, the joints desirably are sprayed with insulation while at the same time insulating the printed circuit conductors. It is noted, however, that the insulating substrate of the adjacent board provides insulation, the only exception being a conductor pattern on the outermost board. FIG. 3 also shows a desirable feature in that insulating spacers 32 can be provided between adjacent boards to facilitate and provide cooling of the coil end turn conductors. If desired, a fan can be provided to force circulate air for improved cooling. As was mentioned, instead of spray-insulating each board individually, the assembly of end cap boards can be potted with a suitable insulating material to thereby insulate all the boards in a single operation. When so potted, of course, there is no circulation of cooling air.

Figure 7:
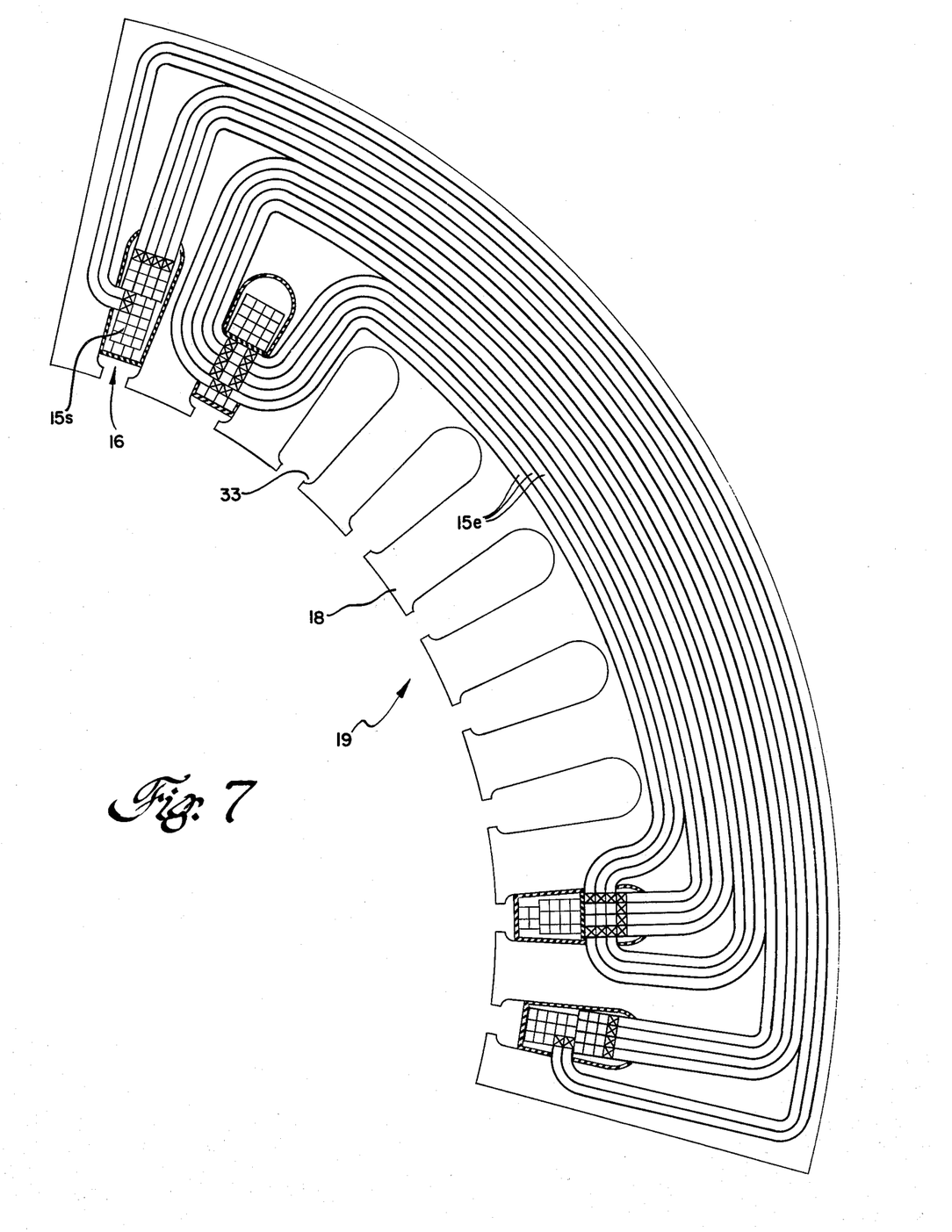
FIG. 7 is a partial plan view of an end cap board according to another embodiment of the invention employing discrete coil end turn wires in a planar, nested arrangement.

The preferred embodiment of the invention illustrated with regard to FIGS. 7–12 is suitable for motors with larger current-carrying capacity and utilizes end cap boards in which the adhered planar array of coil end turn conductors are discrete preshaped wires with a rectangular or square cross section in a nested arrangement. By way of example, a stator core and winding assembly for a medium, 7 ½ hp, three-phase ac induction motor with a squirrel cage rotor is described. This motor has 36 stator slots and has 12 end cap boards in each end cap, and in each set of 12 boards there are four different board patterns. FIG. 7 shows a typical 90° sector of a single ring-shaped end cap board 19 comprised by a rigid insulating board substrate 18, such as glass epoxy printed circuit board, having adhered planar array of nested, shaped coil end turn wires 15e. The other three sectors of this typical end cap board have similar nested arrays of pre-shaped discrete wires. Substrate board 18 has a plurality of inwardly opening slots 33 or enclosed openings for passage of the various insulated bundles 16 of coil side wires, one bundle for each stator slot 21. Openings 33 may correspond in shape to the stator slots 21, or desirably have a reduced size or have graduated sizes so as to be more closely in alignment with the particular coil side wires to which joint connections are to be made. In this view only the four insulated bundles 16 of coil side wires actually making connection to a coil end turn wire 15e are shown. Within each insulated bundle 16, the various individual straight coil side wires 15s making up the bundle are stacked or arranged in a predetermined pattern so that the location of the particular side wires to which joint connections are to be made is known. As will be further described, the straight coil side wires 15s in each bundle preferably have graduated lengths, and the particular wires in each bundle to which joint connections are made are indicated by a "x". Upon assembly of end cap board 19 against the stator core end face, the end cap board is aligned so that the preselected coil end turn wires and straight coil side wires to be joined are in proper alignment to make the fusion joint. It is observed in FIG. 7 that for each pair of adjacent stator slots, one stator slot has a full coil, while the adjacent stator slot has two half coils separated by an insulating insert. Moreover, additional end cap boards are required for these particular coils in order to make a connection to the unmarked straight coil side wires 15s.

Figure 8:
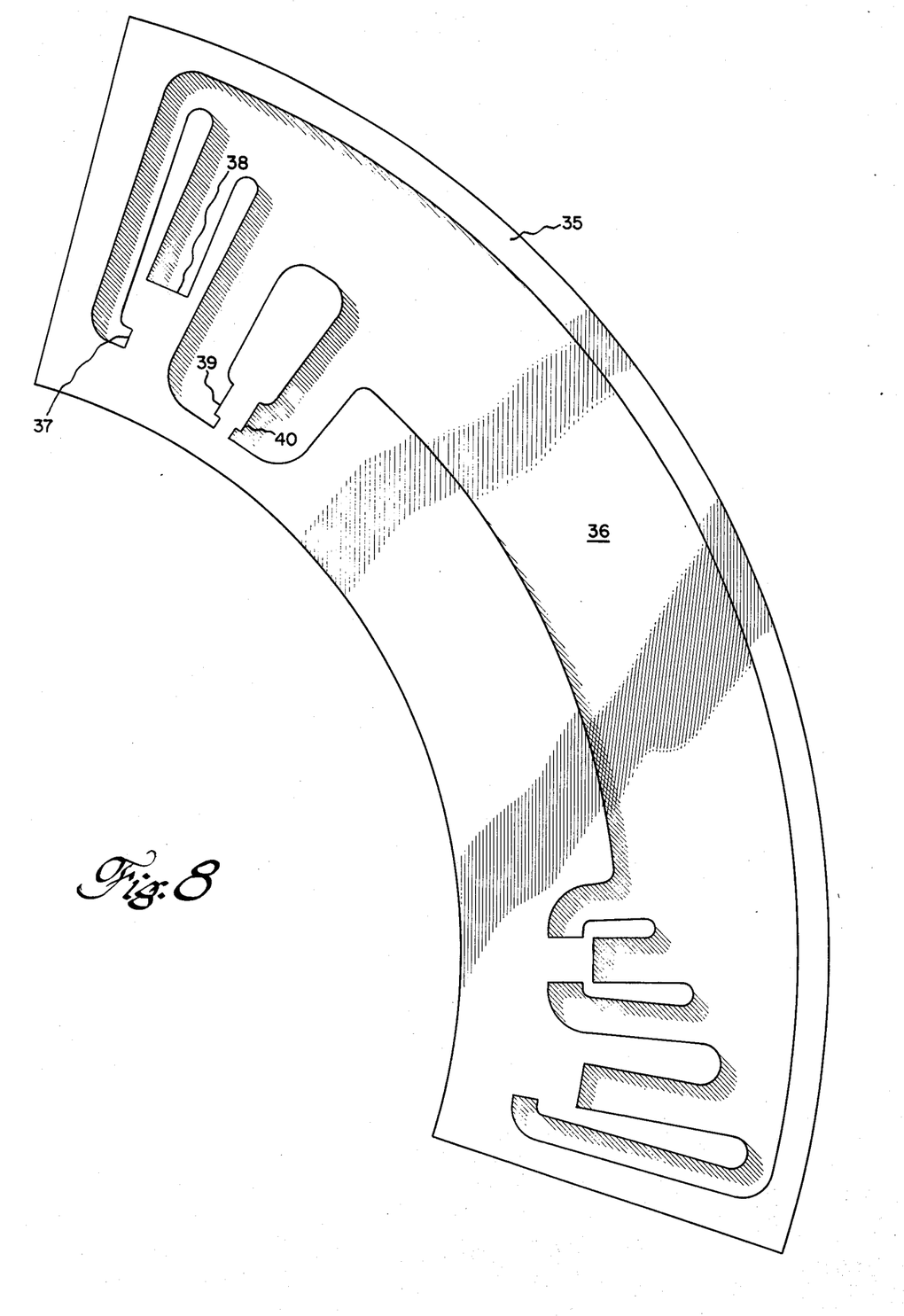
FIG. 8 is a plan view of a template for manufacturing the end cap board with shaped discrete wires for larger motor sizes shown in FIG. 7.

FIG. 8 shows a corresponding 90° sector of an annular template 35 to facilitate manufacture of the planar array of discrete coil end turn wires 15e in the illustrated nested arrangement, and to facilitate transfer of the planar arrays and adherence to the rigid insulating substrate 18. By comparing FIG. 8 with FIG. 7, it is seen that the outline of a depressed area 36 in template 35 corresponds to the desired nested wire arrangement, and individual coil end turn wires 15e cut to length from a spool as in FIG. 1a are pre-shaped and aligned by being laid down side by side within depressed area 36. A numerically control machine can be used to advantage for this operation of automatically cutting to length and curving. The template automatically aligns the end portions of the outermost wires against the straight surfaces 37 and 38 so as to be in position for making the fusion joints, while the end portions of the inner groups of wires are aligned against surfaces 39 and 40. When the complete nested arrangement of coil end turn wires are in place, the printed circuit substrate board 18 can be adhered to the four planar arrays needed for each end cap board. An alternative process for some applications is to pot with insulating material to make the boards.

Instead of fabricating the planar coil end turn wire patterns as has been described by cutting and curving discrete wire from a spool, an alternative process is to cast the nested wire arrangements. A planar array according to this technique is made in two parts, each having alternate wires, and the two parts are then assembled in interdigitated manner. A second alternative process is to machine the planar arrays of coil end conductor wires out of a sheet of copper.

Figure 9:
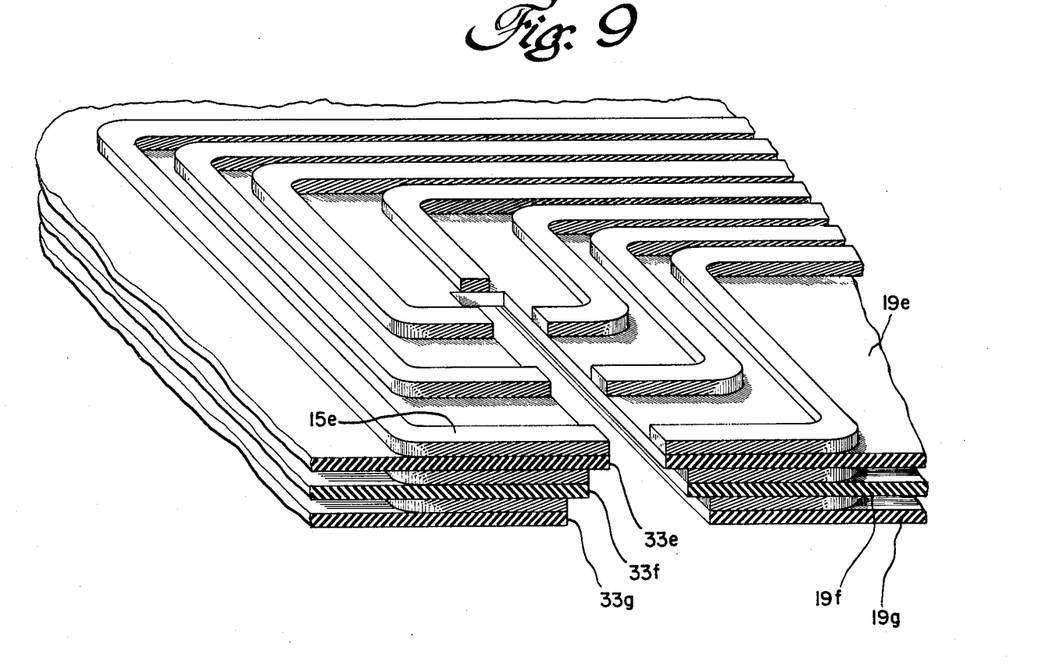
FIG. 9 is a schematic partial perspective view of three assembled end cap boards aligned for automatic connection to coil side wires.
Figure 10:
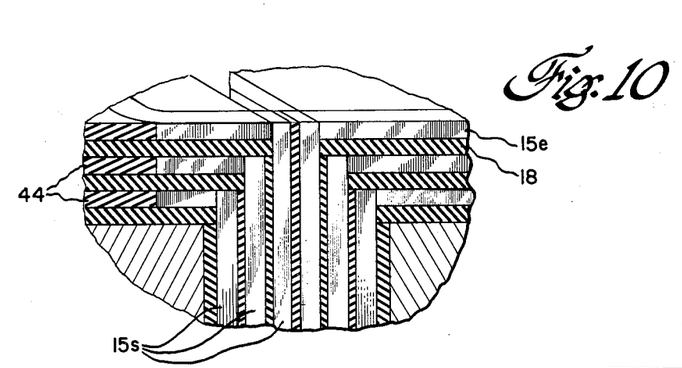
FIG. 10 is a partial perspective in elevation of graduated length coil side wires joined to the three layer end cap illustrated in FIG. 9.
Figure 11:
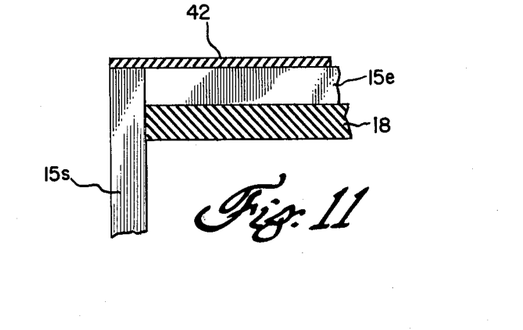
FIGS. 11 and 12 are enlarged side views of a single joint shown in FIG. 10 and a variation thereof.
Figure 12:
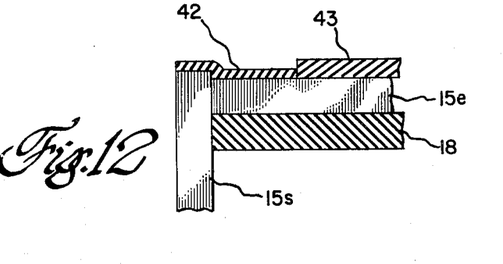

A preferred configuration to facilitate assembly of the end cap boards in superimposed relationship and alignment of the coil side wires and coil end turn wires to be joined is shown diagrammatically in FIGS. 9 and 10. In this construction, the straight coil side wires 15s in each insulated bundle have graduated lengths, and in mirror image fashion the stacked end cap boards have aligned openings of graduated sizes. For simplicity in FIG. 9, the graduated openings 33e–33g in boards 19e–19g are shown as being aligned rectangular slots. Upon assembling the boards individually to the coil side wire bundles, the exposed end portions of coil end turn wires 15e and coil side wires 15s are in alignment for the making of fusion joints. As has been mentioned, ordinarily an end cap board is assembled against the stator core end face and the joint connections fabricated, another board is assembled and joined, and so forth. The fabricated laser fusion joints or other type of fusion joints can be spray insulated before the assembly of the next end cap board. FIG. 11 shows an even fusion joint between the butting end portions of the coil side and end turn wires, with the coil insulation being completed by a sprayed layer 42 of varnish or other insulating material. The individual coil end turn wires 15e cut from the spool in FIG. 1a are pre-insulated, it is recalled, as are the individual coil side wires 15s. FIG. 12 shows an optional uneven fusion joint wherein the end cap construction further includes spacer members 43 between the individual end cap boards for improved cooling of the motor coils. The alternative technique for insulating the joint connections is to pot the assembled boards with insulating material as a single operation at the end. This is illustrated only at the left side of FIG. 10 wherein the filler potting material 44 for example is a suitable cast epoxy.

The stator core and winding assembly with sectionalized coils as herein described can be manufactured at lower cost, as compared to manually fabricated and inserted motor coils, due to the extensive use of automation. Additionally, inventory is minimized inasmuch as the number of special coils is reduced to combinations of a small number of parameters. The reduction in manufacturing costs is achieved, advantageously, without sacrifice of electrical performance or with improved electrical performance. The packing density of straight coil side wires 15s within stator slots 21 (see FIG. 7) can be increased to thereby result in a better space factor. That is, more coil side wires can be inserted in a stator slot of given size, or alternatively the stator slot can be made smaller. Since the insulated bundle 16 of straight coil side wires can be inserted longitudinally into the stator slots, the slot gap at the inner periphery of the stator core 20 can be reduced, thereby increasing the magnetic flux to the rotor. A shorter motor with reduced axial length can be produced due to the improved packing density of the coil end turn conductors. As has been mentioned, improved cooling of the motor coils is obtained by force circulating air between the stacked end cap boards at each end.

While the invention has been particularly shown and described with reference to several preferred embodiments thereof, it will be understood by those skilled in the art that the foregoing and other changes in form and details may be made therein without departing from the spirit and scope of the invention.

The invention claimed is:

1. A process for manufacturing an electric machine stator core and winding assembly with sectionalized coils comprising the steps of
    providing a magnetic stator core having opposing end faces and a plurality of peripherally spaced, axially extending stator slots,
    cutting a continuous length of electrical wire with a rectangular cross section into straight coil side wires of different lengths, forming bundles of straight coil side wires with graduated lengths of wire in each bundle which are stacked in a predetermined pattern, and applying an external insulating layer to every bundle while leaving the end portions of the coil side wires exposed,
    inserting said coil side wire bundles longitudinally into designated stator slots,
    fabricating end cap rigid insulating boards each with an adhered planar array of rectangular cross section coil end turn conductors having the ends thereof exposed in a predetermined pattern,
    successively assembling the end cap boards in superimposed relationship in two groups respectively parallel to the stator core end faces with the ends of selected coil side wires in every bundle butting against the ends of selected coil end turn conductors on a plurality of end cap boards and, alternately with the assembly of the end cap boards, making joints between coil side wires and end turn conductors in butting engagement to form a continuous winding.

2. The process according to claim 1 wherein the step of fabricating the individual end cap boards comprises assembling in a nested arrangement discrete wires which are cut from a continuous length of wire and preshaped, and adhering the nested wires to a rigid insulating board.

3. The process according to claim 2 further including the step of applying an insulating layer over every fabricated joint before assembling the next end cap board.

4. A process for manufacturing an electric machine stator core and winding assembly with sectionalized coils comprising the steps of
    providing a magnetic stator core having opposing end faces and a plurality of peripherally spaced, axially extending stator slots,
    cutting a continuous length of electrical wire with a rectangular cross section into straight coil side wires of different lengths, forming bundles of straight coil side wires with graduated lengths of wire in each bundle which are stacked in a predetermined pattern, and applying an external insulating layer to every bundle while leaving the end portions of the coil side wires exposed,
    inserting said coil side wire bundles longitudinally into designated stator slots,
    fabricating end cap rigid insulating boards each with an adhered planar array of rectangular cross section coil end turn conductors, said boards having aligned openings of graduated sizes with the exposed ends of the coil end conductors arranged about the board openings in a predetermined pattern,
    successively assembling the end cap boards in superimposed relationship in two groups respectively parallel to the stator core end faces with the ends of selected coil side wires in every bundle extending through the aligned board openings into butting engagement with the ends of selected coil end turn conductors on a plurality of end cap boards and, alternately with the assembly of the end cap boards, making joints between coil side wires and end turn conductors in engagement to form a continuous winding.

* * * * *